United States Patent [19]

Carotti

[11] Patent Number: 5,035,846
[45] Date of Patent: Jul. 30, 1991

[54] SYSTEM AND PROCESS FOR CONTINUOUS MANUFACTURE OF CELLULAR PRODUCTS SUCH AS LATEX FOAM MATTRESSES, CUSHIONS OR THE LIKE

[75] Inventor: Luciano Carotti, Seriate, Italy

[73] Assignee: Pirelli SAPSA S.p.A., Milan, Italy

[21] Appl. No.: 407,334

[22] Filed: Sep. 14, 1989

[30] Foreign Application Priority Data

Sep. 15, 1988 [IT] Italy ................ 21950 A/88

[51] Int. Cl.⁵ ............................. B29C 67/22
[52] U.S. Cl. ......................... 264/48; 264/51; 264/157; 264/321; 264/338
[58] Field of Search ........... 264/45.8, 48, 321, 45.6, 264/45.1, 51, 338, 157

[56] References Cited

U.S. PATENT DOCUMENTS

| | | | |
|---|---|---|---|
| 3,320,339 | 5/1967 | Smith | 264/45.1 |
| 3,335,207 | 8/1967 | Richie | 264/48 |
| 4,082,824 | 4/1978 | Del Carpio | 264/48 |
| 4,088,722 | 5/1978 | Marjoram | 264/51 |
| 4,172,917 | 10/1979 | Angelle et al. | 264/45.8 |
| 4,442,167 | 4/1984 | Iwasa et al. | 264/176.1 |
| 4,473,667 | 9/1984 | Sands | 264/45.3 |
| 4,605,683 | 8/1986 | Broslaw | 264/51 |
| 4,870,112 | 9/1989 | Knipp et al. | 521/70 |

Primary Examiner—Robert A. Dawson
Assistant Examiner—Allan R. Kuhns
Attorney, Agent, or Firm—Stevens, Davis, Miller & Mosher

[57] ABSTRACT

The process includes molding a plurality of recesses on a layer of foam material which is laid on a laying surface and moved forward. These recesses include a base open on the laying surface and are subsequently cross-linked by introducing steam under pressure through the bases of the recesses into cavities of the recesses formed during the molding step. The plant includes a conveyor element in which a plurality of plates disposed side-by-side are provided with protuberances corresponding to the recesses to be formed in the foam layer. The protuberances are open at their bases to enable introduction of steam into an inner space within each of the protuberances.

13 Claims, 3 Drawing Sheets

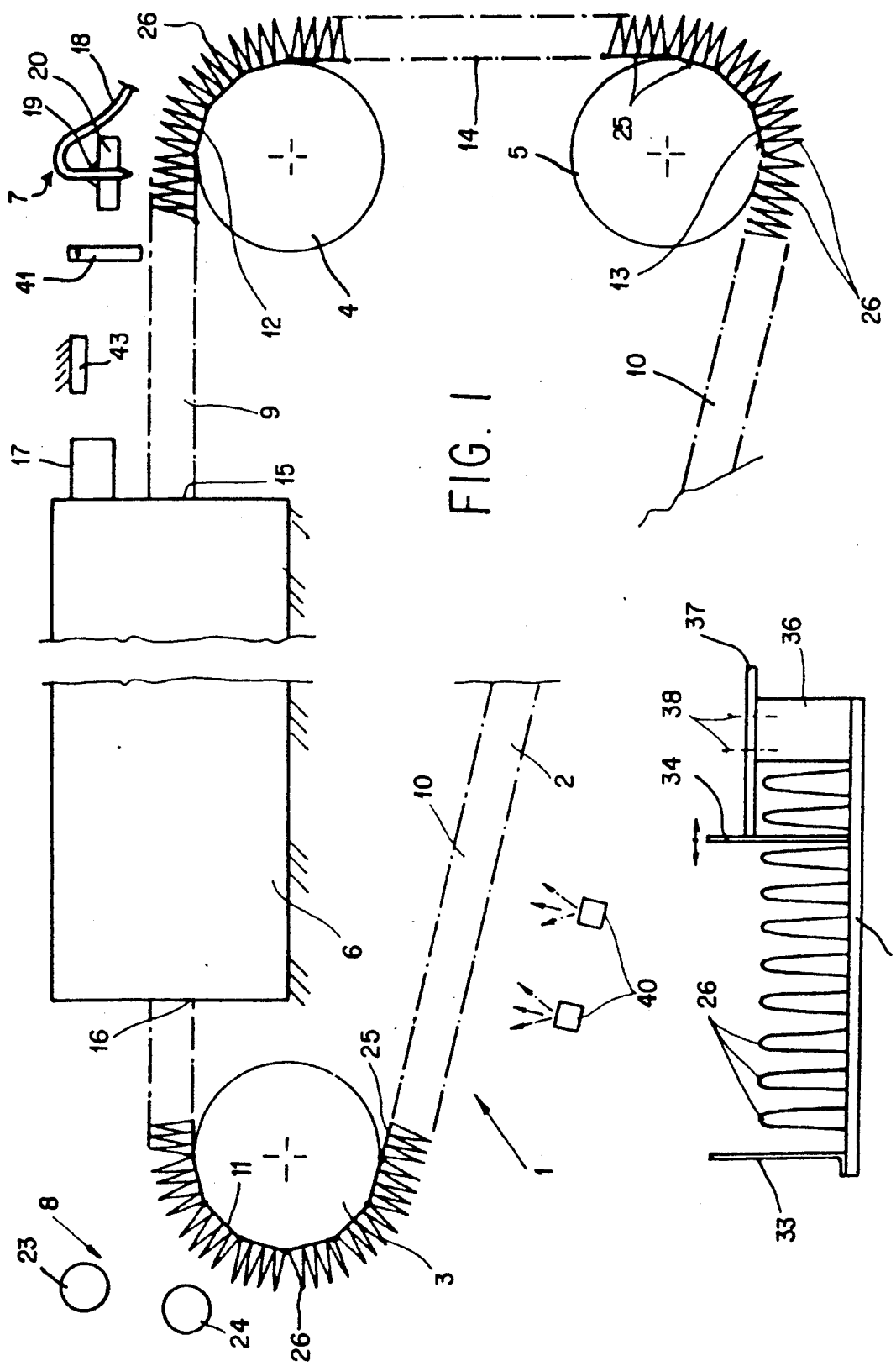

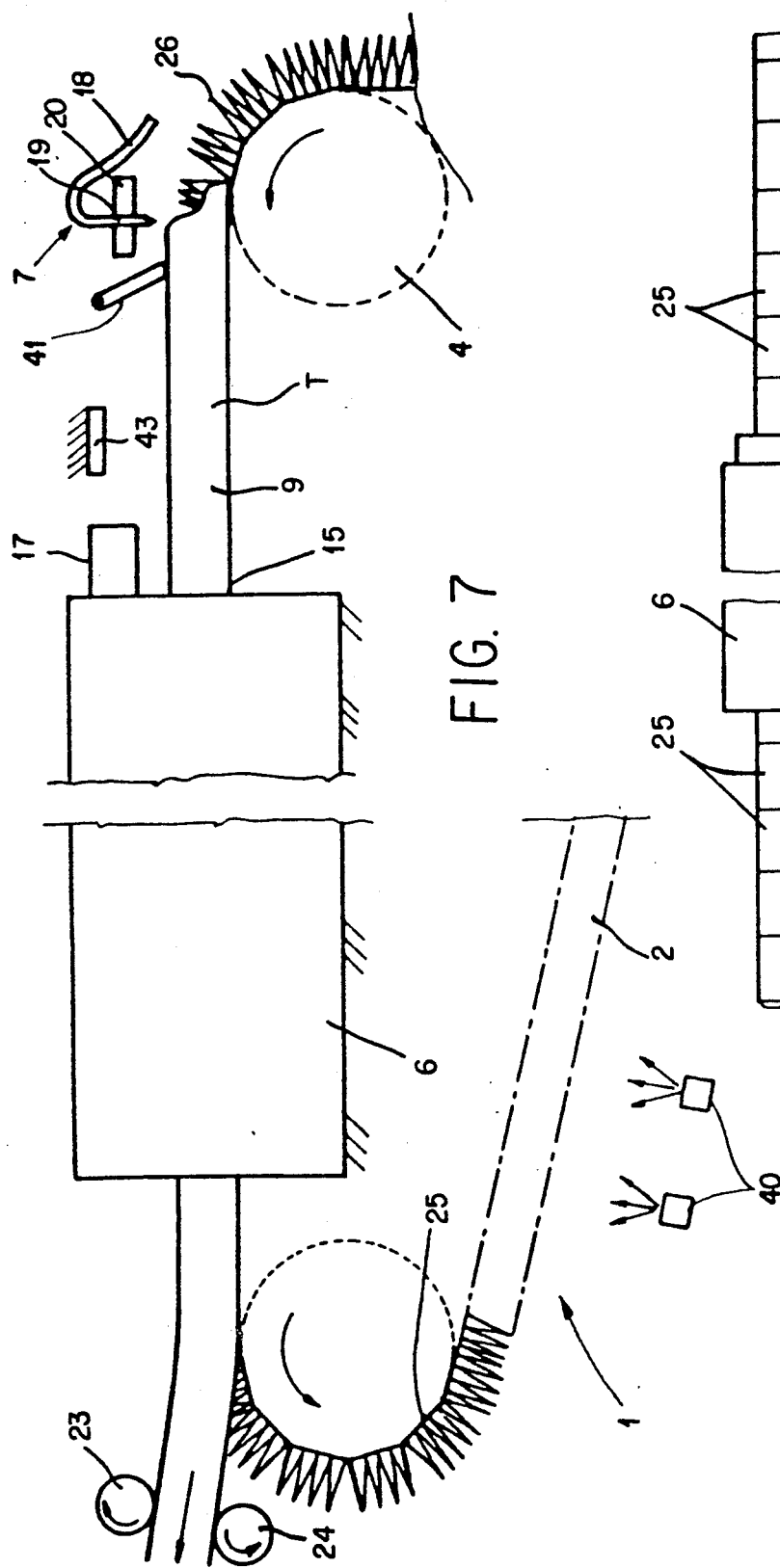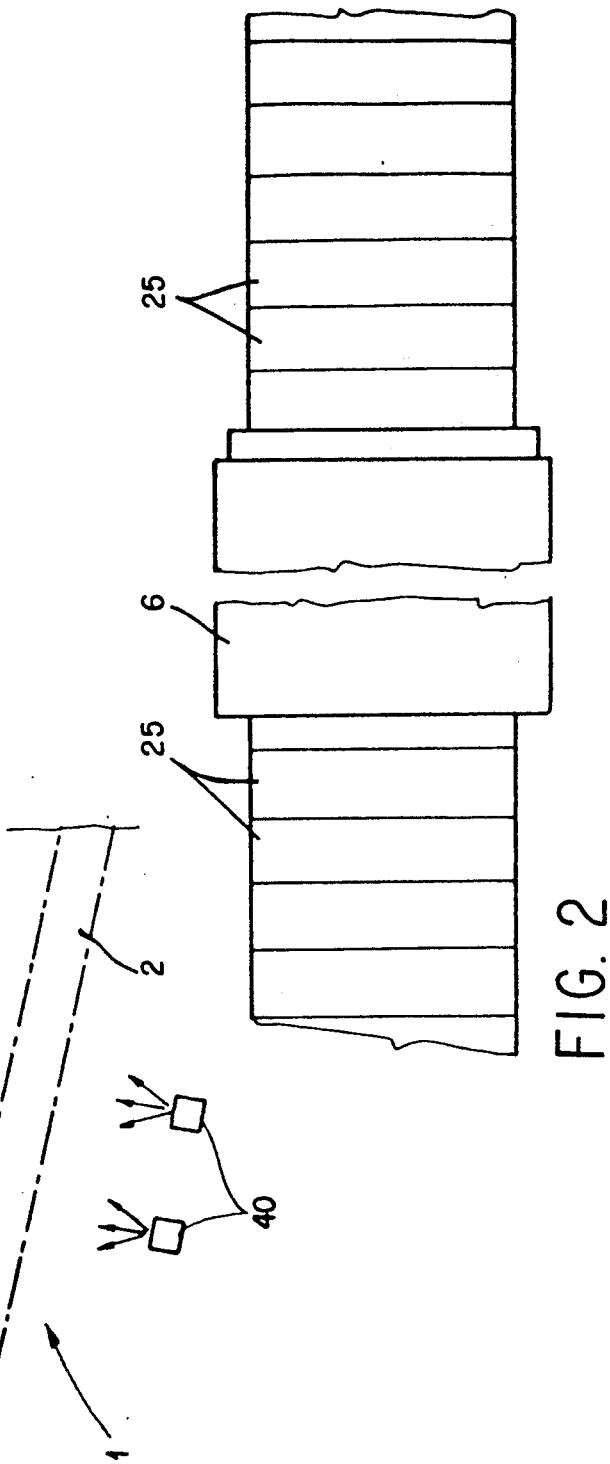

SYSTEM AND PROCESS FOR CONTINUOUS MANUFACTURE OF CELLULAR PRODUCTS SUCH AS LATEX FOAM MATTRESSES, CUSHIONS OR THE LIKE

FIELD OF THE INVENTION

The present invention relates to a plant and process for continuous manufacture of products formed of foam material and having recesses, such as latex foam mattresses, cushions and the like.

BACKGROUND OF THE INVENTION

Mold processes for manufacturing the above type of products with recesses or cells are known. For example, according to a known process, the manufacture of a cellular mattress is effected by employing a mold which opens into two halves and filling the mold partially with latex foam material and allowing the latex foam material to foam when the mold is closed. One or both parts of the mold are provided with a plurality of protuberances which have an overall conical shape or a substantially cylindrical shape with a conical end; these protuberances have a shape corresponding to the recesses or cells of the mattress to be formed. The mold is adequately heated by introducing a liquid at a predetermined temperature for thermal treatment of the article along an appropriate outer hollow space. In a subsequent step, the mold is opened and the mattress must be manually removed from the upper cover since the mattress becomes adhered to the protuberances of the upper cover during the molding process. In succeeding steps, the mattress is washed to remove undesired substances in the finished product and it is then subjected to a drying process.

In another heretofore known process, a plurality of molds arranged on trolleys placed one after the other are advanced through a tunnel vulcanizer which is steam heated. Unlike the first mold process, in this case a foam material which is emulsified with air and free of swelling agents is injected through particular holes provided on the cover until the whole volume of the mold is filled and fins of material overflow from proper openings of the mold to guarantee the appropriate dimension of the final product. Further steps of the process, i.e., opening of the molds and removal of the mattress, washing and lastly drying, are more or less the same as those of the first mold process.

It will be readily understood that the above-described mold processes require, to achieve certain dimensions for each product, a mold with corresponding dimensions. Therefore, if the width or height of the mattress is to be varied, it is necessary to plan and provide a new mold in order to satisfy the various market demands for different sized products.

Mold processes for manufacturing and marketing products with recesses, which are for the same use but have different dimensions, generally have a drawback in that they incur a high cost for their realization. Moreover, to implement such processes requires manual intervention by one or more operators, as, for instance, the removal of the mattress from the protuberances of the open mold with the negative consequence of damaging the products resulting from an excessive pull on a just-shaped spongy material and the great discomfort that the operator suffers from the significant heat emission resulting from the opening of the mold. Unfortunately, such mold processes furthermore result in cellular products with some flaws relative to the desired product. The cause of such product flaws is mainly connected to the vulcanizing step. In fact, to effect the vulcanizing step, it is necessary to utilize pressurized, very hot steam which is caused to circulate all around the mold along appropriate hollow spaces with consequent transfer of heat from the steam to the metallic masses of the mold, i.e., to the walls and protuberances of the mold. As the protuberances are numerous and are distributed in a regular manner in the foam mass, they transfer the vulcanization heat also to the product.

Unfortunately, the connections between protuberances and cover may give rise to an irregular cross-linking from one point to the other of the foam. This negative circumstance is due to the fact that each protuberance is associated with the cover through a metal plate that closes completely the inside of the protuberance to form a closed cavity. In some cases, the steam, due to its high pressure, is able to penetrate between the plate and the lateral wall of the protuberance to occupy at least partially a part of the cavity. Subsequently, at the end of the cycle, the steam deposits as a condensate and, as a consequence, the mold may have, in the vulcanizing step, either protuberances with empty cavities or protuberances whose cavities are partially filled with steam condensate.

It will be readily understood that the different heating conditions to which the different protuberances may be subjected can cause non-uniform cross-linking operations of the foam giving rise to a cellular product with characteristics different from one zone to the other. In these circumstances, the product, for instance a mattress, may exhibit during use the drawback of tearing in the zone which is less vulcanized as a result of numerous folding cycles of said zone.

Another process is known for manufacturing a layer of spongy material of unlimited length based on a technique of continuously rotating a steel tape between rollers forward the planar portion of the tape through a tunnel vulcanizer heated with high-pressure steam. At the entry of the planar portion of the tape, the foam material is injected and distributed in opposite senses to each other along a direction transverse to the advancing direction of the tape to form the desired thickness of the layer. After the vulcanization step, the foam layer is cut according to desired dimensions and then is passed through the usual washing and drying steps.

This continuous process could overcome some of the drawbacks cited in the above-described mold processes, i.e., either that of (1) obtaining products with different widths through suitable cutting operations transverse of the layer, (2) overcoming the numerous manual operations following the opening of the molds to remove the single products or (3) eliminating the discomfort experienced by the operators due to heat emission into the working ambient upon opening the molds.

However, it noted that this process is not suitable for manufacturing products with recesses in which, conventionally, the thicknesses of the foam can reach 20 cm and over.

In fact, the heat inside the steam tunnel can be used tor vulcanizing products with a low thickness, namely of several centimeters, but it is not sufficient for vulcanizing products with greater thicknesses. In substance, since this continuous process lacks the plurality of protuberances present in the molds of the mold processes described above and immersed in the surrounding foam mass to which the protuberances transfer vulcanization heat, the continuous process described above, which is based on the use of a steel tape, can be used only for manufacturing products without recesses with a thickness to a maximum of 5 cm, for instance, for plugs used for removing facial make-up and to be thrown away after use or to form possible upper and lower layers in a spring mattress. It is therefore readily understandable how this continuous process excludes the possibility of manufacturing products with recesses of latex foam, among other things mattresses with recesses having thicknesses between 14 and 18 cm, as for example mattresses of 14 cm thickness with cells having a depth of 11 cm.

SUMMARY OF THE INVENTION

Therefore, it is an object of the present invention to provide a process and plant for manufacturing products having recesses and formed of a foam material such as a latex polymer material which overcome all of the above-noted disadvantages in the prior art.

The present invention provides a process for manufacturing products having recesses and formed of foam material, wherein the products are in the form of a continuous layer of unlimited length divisible into single pieces of predetermined dimensions. The process includes the steps of: (1) continuously rotating a laying surface closed in a ring configuration defined at any moment by a planar portion moving forward according to a first direction and a return portion moving in an opposite sense to the first direction; (2) laying the foam material at the beginning of the planar portion of the laying surface in a transverse sense to the first direction to provide a foam layer of predetermined thickness on the laying surface; (3) vulcanizing the foam layer downstream of the beginning of the planar portion between a first and a second position by supplying heat between the first position and the second position via pressurized steam; (4) forming a plurality of recesses in the foam layer as it is being laid on the laying surface, the recesses comprising a base open at the laying surface and having a predetermined height which is smaller than the total thickness of the foam layer; and (5) introducing pressurized steam through the base of the recesses to supply heat into the cavity formed during the recess-forming step.

It should be noted that the present process has a characteristic step of molding a plurality of recesses in the thickness of the foam layer as it is being laid and a further characteristic step of introducing steam under pressure into the molding cavity during the vulcanizing step. The result obtained via these characteristic steps enables the drawbacks resulting from the vulcanizing step of the prior art process employing a mold open into two halves to be overcome. In fact, the molding cavities corresponding to the cells are of the order of some thousands in a portion of the continuous foam layer corresponding to a mattress and may have heights equal to 70% and 80% of the total thickness of the finished product. Consequently, the heat supplied by the steam inside the cavities can spread directly in a uniform and complete manner over the entire portion of the cellular foam. In practice, by introducing steam inside all of the molding cavities of the cells, the cross-linking of the cellular foam mass is complete and homogeneous and overcomes thus the drawbacks of the mold vulcanizers discussed above in which the presence of metallic protuberances which are hollow but closed at their bases, resulted in, due to possible steam infiltrations either with empty protuberances or protuberances with condensate, unacceptable products deriving from a non-uniform cross-linking from one zone to the other.

Moreover, the present process provides the advantage of enabling the formation of a continuous foam layer having recesses with possible variations of the thickness of the foam layer over the recesses. In fact, the invention makes it possible to conveniently act on the advancing speed of the laying surface on which the foam layer is laid and on the transverse injection speed of the foam to obtain a product of predetermined height. In the preferred embodiment, the desired height is conveniently regulated by means of a leveling operation through a rigid surface arranged at a predetermined distance from the laying surface of the foam layer. Moreover, the formation of a continuous layer of foam with recesses enables advantageously a plurality of transverse cuts to be made on the vulcanized layer maintaining the continuous cutting lines at a desired distance from one another so as to obtain, for instance, mattresses all having the same width or mattresses having a variable width each time depending on customer requirements.

Therefore, the present process overcomes all of the drawbacks of the prior art mold processes in which the fixed dimensions of the mold did not permit formation of recessed articles for the same use but with different dimensions.

The present invention further provides a plant for continuously manufacturing products having recesses and formed of foam material in the form of a layer of unlimited length divisible into single pieces of predetermined dimensions. The plant includes: (1) a conveyor element closed in a ring configuration around at least two circular units rotating around parallel axes, the ring configuration being defined by a planar portion and a return portion connected together by curvilinear portions; (2) a tunnel vulcanizer provided with high-pressure steam and crossed by said planar portion between two extreme positions thereof; (3) a foam laying device for laying foam material on the conveyor element; and (4) a station for the entry of the planar portion comprising a support structure which is suspended with respect to the conveyor element and a driving means associated with the support structure for moving the laying device back and forth in a transverse direction relative to the conveyor element. The conveyor element comprises a supporting surface formed by a plurality of plates. Each plate is provided with outwardly projecting protuberances which are shaped to have an outer configuration which corresponds to the shape of the recesses of the product to be manufactured. The protuberances are hollow inside and open at their base adjacent the surface of the plates. Each plate is laterally associated with means for transmitting motion in cooperation with the rotating units.

BRIEF DESCRIPTION OF THE DRAWINGS

The above and other objects, advantages and features of the invention will be more fully understood when considered in conjunction with the following discussion and the attached drawings, of which:

FIG. 1 is a lateral view of the plant with various parts broken away in the middle;

FIG. 2 is a top partial view of FIG. 1 with parts broken away.

FIG. 6 is a front view of a laying plate with the lateral boundary walls;

FIG. 7 shows a continuous layer formed by the plant of FIG. 1;

DETAILED DESCRIPTION OF THE PREFERRED EMBODIMENTS

Figure 3:
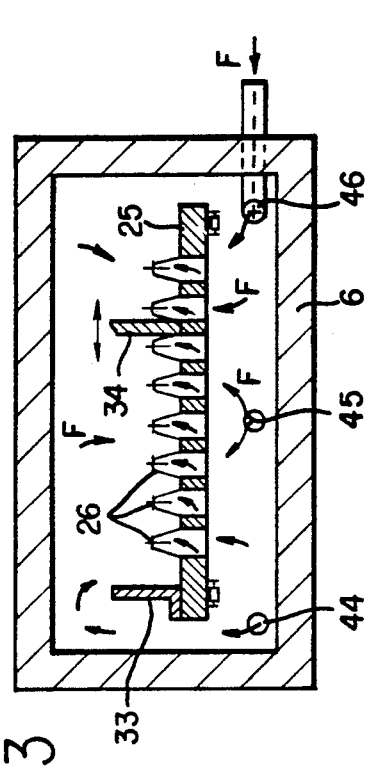
FIG. 3 is a cross section of the vulcanizer shown in FIG. 1.

In FIG. 1, reference numeral 1 refers to a plant for continuously manufacturing products formed of latex foam material and having recesses or cells, for instance a synthetic latex of butadiene styrene.

Plant 1 provides for manufacturing a continuous layer of unlimited length divisible into single pieces of predetermined dimensions. For example, plant 1 is suitable for manufacturing mattresses, comprising cells open on their innermost surface.

With reference to FIG. 1, plant 1 comprises a conveyor element 2 closed as a ring around rotating circular units 3-5, a tunnel vulcanizer 6 provided with pressurized steam, a device 7 for injecting foam material, and a mechanism 8 for automatically removing the continuous layer.

More specifically, the configuration of conveyor element 2 is defined instantaneously in its upper part by a planar portion 9 and in its lower part by a return portion 10.

Portions 9 and 10 are connected at their outermost ends by a curvilinear portion 11 shaped in a circular arc and at their other ends by two circular arc-shaped curvilinear portions 12 and 13 joined together by a vertical rectilinear portion 14.

Tunnel vulcanizer 6 is crossed by planar portion 9 of the conveyor element between two extreme positions 15 and 16.

Moreover, in proximity of extreme position 15 of the vulcanizer above planar portion 9 there is provided a heating element 17.

Injection device 7, placed at the entry station of planar portion 9, comprises substantially a flexible tubular duct 18 connected at one end to a pump (not shown) sucking into a tank containing the butadiene styrene latex foam.

End 19 of tubular duct 18 is associated with a structure 20 which is suspended with respect to conveyor element 2. End 19 is moved back and forth in a direction transverse of conveyor element 2 through driving means of any type, for example, a trolley set in action by a chain control moved by a motor.

Mechanism 8 for automatically removing the continuous layer is formed by a pair of cylindrical rollers 23, 24 arranged opposite to each other and above conveyor element 2 in proximity of the final end of planar portion 9.

The essential characteristics of conveyor element 2 is described in detail below.

The supporting structure of the foam layer is formed by a plurality of plates 25 (FIGS. 1 and 2) of aluminium. Each plate connects through a soldering or screwing operation a plurality of conical protuberances 26 of aluminium projecting outwardly.

Inside, the protuberances are hollow and open at their bases (FIG. 3) to permit the introduction of steam during the vulcanizing step.

Plates 25 are associated at their ends with two lateral chains engaging laterally with the respective gear wheels 3-5 (FIG. 1).

Figure 4:
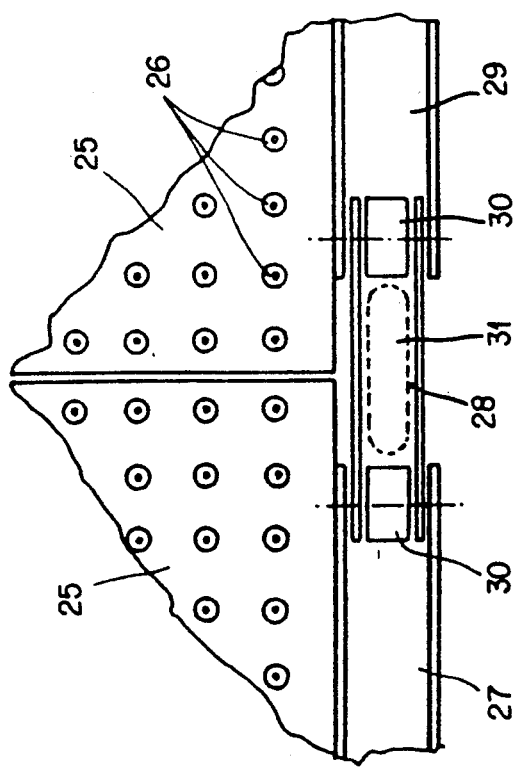
FIG. 4 shows schematically two laying plates of the plant of FIG. 1 associated to a gearing chain.

Each chain, which may be of any known type, comprises in the schematic view made by way of example in FIG. 4, adjacent links 27-29 forming empty spaces and connected to one another by pins 30 adapted to receive thrusts or to transmit motion during the meshing step with teeth 31 (represented with a dashed line) of a gear wheel.

Figure 5:
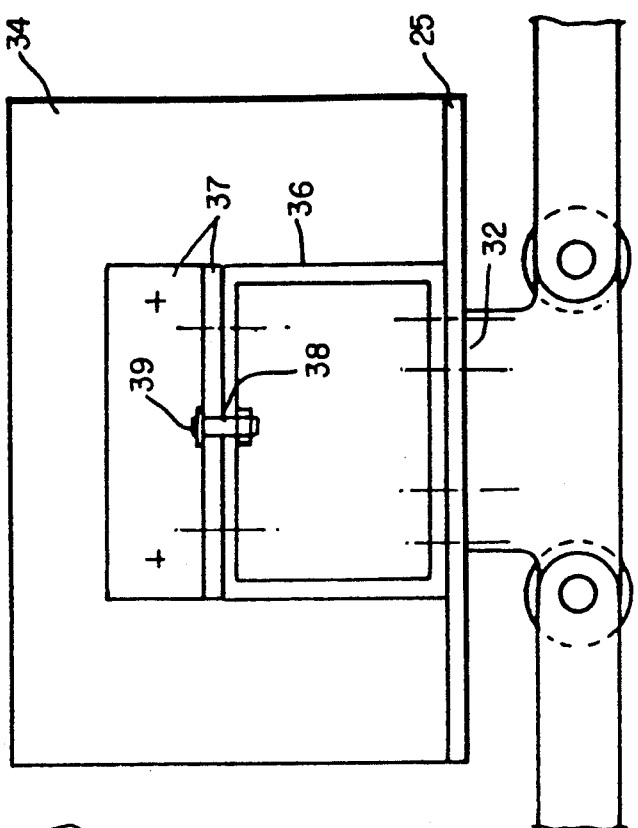
FIG. 5 shows one of the lateral boundary walls of the laying plates.

As shown in FIG. 4, the ends of one same side of plates 25 are integral or of a one-piece construction with the lateral chains in the zones 32 of a link (FIG. 5) so as to permit, during the continuous movement of conveyor element 2, the passage from a configuration in which plates 25 are all placed side by side along planar portion 9 and return portion 10 to a configuration in which plates 25 are separated from one another according to polygonal profiles in circular arc-shaped curvilinear portions 12 and 13 (FIG. 1).

Further, plant 1 is characterized in that it comprises boundary means for providing a lateral boundary of the foam layer to obtain mattresses of the desired length.

Preferably, the boundary means comprise on each plate 25 rigid walls 33, 34, preferably of aluminium, opposite to each other and arranged perpendicular to the surfaces of plates 25 (FIG. 6).

Also preferably, one of walls 33, 34 is movable with respect to the other to enable the apparatus to be used to make mattresses of different predetermined lengths.

According to one of the possible embodiments (FIGS. 5 and 6), in proximity of one end of each plate 25, there is provided a supporting block 36 with respect to which an L-shaped strap 37 or the like can slide longitudinally of plate 25. Strap 37 is provided with a projecting mobile part or rigid wall 34 to be inserted between two contiguous rows of protuberances 26.

Both block 36 and strap 37 are provided with connection means for providing a mutual connection therebetween. The connection means can comprise two rows of holes 38 for providing mutual blocking through suitable pins 39.

Manufacture of the continuous layer of cellular foam to obtain single mattresses is effected as follows.

The conveyor element 2, which undergoes continuous rotation, moves the various laying plates 25 (FIG. 1) cyclically at a spraying station 40 placed below the first part of the return portion 10.

In the spraying station, a plurality of nozzles inject antiadhesive substances on protuberances 26 so as to facilitate subsequent removal of the continuous layer from protuberances 26 themselves (FIG. 7).

After travelling over return portion 10, plates 25 associated with the lateral chains and separated from one another along the arcs traversed while winding around gear wheels 3-5 reach gradually the entry station of the planar portion 9 placed side by side below foam injecting device 7.

At the entry station of planar portion 9 the mechanism for setting in action the laying device moves end 19 of the tubular duct back and forth in the transverse direction between rigid walls 33, 34 (FIG. 6) of each plate 25.

The foam, already emulsified with air to reach the desired viscosity, reaches tubular duct 18 through a pump sucking into a tank where the aqueous dispersion of natural or synthetic latex is mixed with the usual surface-active fillers having the task of avoiding the formation of agglomerates of particles before injection.

The laid foam material covers plates 25, the spaces between protuberances 26 and the portion on protuberances 26 up to a level so as to constitute a layer T (FIG. 7) of a given thickness, which is levelled then at the desired height by a blade 41 maintained at a predetermined distance from moving plates 25.

Blade 41 may be mounted with its upper end oscillating around a horizontal axis.

Figure 8:
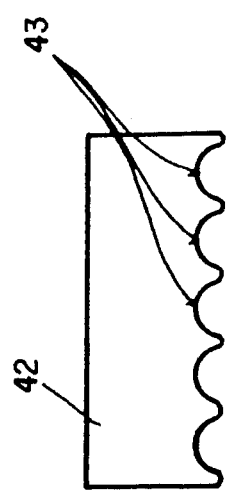
FIG. 8 shows a blade used to mold undulations on the layer of FIG. 7.

Alternatively, blade 41 may be replaced by a blade 42 (FIG. 8) shaped in its lower part with a series of undulations 43' in order to provide a plurality of longitudinal undulations on the outer surface of the foam layer.

Between blade 41 and entrance 15 of the tunnel, the foam layer is conveniently heated via emission of infrared rays through an infrared device 43 in order to facilitate a freezing of the foam and a superficial hardening of the layer.

The freezing of the layer, as known, avoids collapsing of the foam and a corresponding chemical reaction based on the use of a freezing agent. For example, sodium flurosilicate, already introduced in the starting compound, is favored by the characteristic step of feeding heat with the emission of infrared rays.

In particular, and very advantageously, the superficial hardening carried out through the infrared rays protects the continuous foam layer from imprintings and the like that could be caused for whatever reason by action of the outer ambient on the layer.

Moreover, according to one of the characteristics of the invention, the pre-arrangement at the entrance of the vulcanizer of heating element 17 advantageously avoids a problem wherein the steam of the vulcanizer, escaping from the tunnel above and in an opposite direction to the advancing direction of the conveyor element, may be transformed into condensate drops with the risk that falling downwardly such drops might cause indentations on the continuous foam layer in an unacceptable manner.

Following the freezing step, the foam layer passes through the tunnel while remaining subjected to the action of the pressurized steam ejected from appropriate injectors 44, 45 and 46 and then travels in the direction of the arrows shown in FIG. 3.

The pressurized steam striking the bottom of plates 25 penetrates through the openings on plates 25 and passes into hollow protuberances 26 which in turn transfer heat directly to the foam mass in which they are embedded.

Upon coming out of the vulcanizer 6, the continuous layer passes through rollers 23, 24 (FIG. 7) which are moved in opposite directions to each other at a peripheral speed equal to the speed of advance of plates 25 in order to maintain traction forces of constant value suitable for automatically removing the layer from protuberances 26 while avoiding any risk of tearing.

The foam layer which has been vulcanized and removed from the conveyor element is then sent to a suitable chute and is passed through the necessary washing and drying steps, followed by the cutting step to obtain the individual mattresses.

Alternatively, the continuous layer could be cut immediately after vulcanization and then the various lengths could be sent one by one to the subsequent washing and drying steps.

The various mattresses are obtained by making cutting lines which are oriented transversely to the length of the foam layer and maintaining between the contiguous cuts a distance equal to the desired width of the individual mattresses.

The washing steps are carried out substantially according to known techniques and are briefly summarized below.

According to one embodiment, the foam layer or the single mattresses are advanced into one or more water tanks through a plurality of pairs of rotating rollers arranged in opposite sense to one another and at a mutual distance lower than the thickness of the product.

Substantially, the subsequent passage of the product between opposite rollers and subsequent pairs of rollers provides alternate steps including wringing of the foam layer and water intake into the foam layer in order to expel undesired substances from the foam layer.

In particular, during the washing operation, the surfaceactive fillers introduced in the starting compound are expelled.

The further drying operation is carried out by laying the foam layer or the single mattresses on a conveyor belt and causing them to pass through suitable ovens or the like.

It is readily apparent from the above description that the plant according to the invention achieves the objects described above.

In fact, the plurality of plates 25 provided with hollow protuberances 26 projecting outwardly and open at their base permits a capillary and uniform vulcanization of the foam due to the passage of the steam inside the cavities of each protuberance.

Therefore, due to the cited characteristic the disadvantages present in the prior art mold processes during the vulcanizing step, i.e., the possible residue of steam condensate inside the protuberances, are overcome.

Moreover, the independence of plates 25 with respect to each other is a significant feature of the plant of the present invention.

In fact, each plate 25 is individually connected laterally to a link of a chain, so that each plate 25 follows the flexibility of the chains while traversing an arc while winding around the gear wheels.

In practice, due to the cited characteristic, plates 25 are positioned side by side in the planar portion of the conveyor where the continuity of the conveying surface assures the regular laying of the foam material and plates 25 themselves are separated from one another according to a polygonal configuration when they traverse the curvilinear portions around wheels 3-5.

Therefore, the conveyor element is characterized in that it comprises laying planes which are independent of the bending effect around the pulleys and which therefore are not affected by mechanical stresses that would arise in a tape with a continuous surface of a given thickness while traversing an arc while winding around the wheels of the driving device From this characteristic it follows that the various protuberances 26 projecting from plates 25 are also free of mechanical stresses.

Consequently, since the positions of protuberances 26 on plates 25 are unchanged, the desired recessed geometry of the final product is guaranteed.

Therefore, it can be readily understood how the plant according to the invention overcomes the drawbacks of the prior art plants which use a continuous steel tape and a tunnel vulcanizer unsuitable for forming continuous layers of products with recesses of substantial thickness.

Moreover, the preferred characteristic of the plant of the invention relating to the presence of walls 33 and 34 on each plate 25, one of which is movable with respect to the other, enables the width of the foam layer to be varied as desired so that the length of the individual product can be varied after the transverse cut of the foam layer.

Therefore, it is readily apparent how the plant of the invention can be advantageously used, without cost increases for the production of mattresses with recesses and the like for which frequent variations of size are required.

The further preferred characteristic of an undulated blade 42 enables production of, for instance, mattresses having wavy surfaces by using a simple apparatus and an equally simple [continuous superficial imprinting operation of the foam layer.

A further advantageous aspect of the invention is provided by the continuous removal of the already vulcanized foam layer through rollers 23, 24 thus overcoming either the prior art disadvantages of manual steps removing the recessed products from the molds or uncomfortable working conditions to which the operators are subjected due to significant heat emission upon opening the molds.

It should be noted that the above description and the accompanying drawings are merely illustrative of the application of the principles of the present invention and are not limiting. Numerous other arrangements which embody the principles of the invention and which fall within its spirit and scope may be readily devised by those skilled in the art.

I claim:

1. A process for manufacturing products having surface recesses and formed of foamed material, said products being in the form of a continuous layer of unlimited length divisible into individual pieces of predetermined dimensions, said process comprising the steps of:
   (a) continuously rotating an endless laying surface formed in a closed ring configuration oriented to include instantaneously a planar portion moving forward in a first direction and a return portion moving in a second direction opposite to said first direction, said laying surface being provided with a plurality of conical protuberances;
   (b) pouring foam material on said laying surface at a beginning portion of said planar portion in a direction transverse of said first direction to form on said laying surface a foam layer having a predetermined thickness and a plurality of recesses each of which comprises a base open adjacent to said laying surface and a cavity portion and having a predetermined height which is less than a total thickness of said foam layer and;
   (c) vulcanizing said foam layer at a position downstream of said beginning portion of said planar portion between a first position and a second position of said laying surface by supplying heat via pressurized stream which surrounds the foam layer, comes in contact with the foam layer, and enters said cavity portion through said base of said recesses.

2. A process as in claim 1, further comprising leveling the foam layer laid on said laying surface by providing a rigid member positioned at a predetermined height from said laying surface, said rigid member extending transverse to said foam layer and being positioned adjacent said laying surface at a position before said foam layer undergoes vulcanizing step (c).

3. A process as in claim 1 or 2, further comprising heating the ambient adjacent said first position at which vulcanizing step (c) is initiated within a predetermined temperature range for maintaining a steam condition.

4. A process as in claim 1, further comprising hardening an outer surface of said foam layer as it is moved forward between said beginning portion and said first position at which vulcanizing step (c) is initiated by supplying heat above said foam layer.

5. A process as in claim 2, further comprising hardening an outer surface of said foam layer as it is moved forward between said beginning portion and said first position at which vulcanizing step (c) is initiated by supplying heat above said foam layer.

6. A process as in claim 3, further comprising hardening an outer surface of said foam layer as it is moved forward between said beginning portion and said first position at which vulcanizing step (c) is initiated by supplying heat above said foam layer.

7. A process as in claim 1, further comprising spraying anti-adhesive substances on said laying surface along said return portion.

8. A process as in claim 1, further comprising applying cutting forces transverse to the moving direction of said foam layer after said foam layer has passed by said second position which said vulcanizing step (c) is terminated to provide adjacent cutting lines separated by a given distance corresponding to a predetermined width of said individual pieces forming said products.

9. A process as in claim 1, further comprising delimiting said foam layer as it is moving forward between two rigid elements disposed opposite to each other, said rigid elements extending perpendicularly to said laying surface and being spaced apart from one another a distance corresponding to a predetermined desired length of said products.

10. A process as in claim 9, further comprising varying a length of said products by moving one of said rigid surfaces with respect to the other.

11. A process as in claim 1, further comprising applying traction forces of constant magnitude on opposite surfaces of said foam layer after it has undergone vulcanizing step (c) and removing said foam layer above said planar portion of said laying surface.

12. A process as in claim 1, wherein said foam material is a latex foam material.

13. A process as in claim 12, wherein said latex foam material is a synthetic latex of butadiene styrene.

* * * * *